(12) United States Patent
Tanaka et al.

(10) Patent No.: US 11,014,042 B2
(45) Date of Patent: May 25, 2021

(54) EXHAUST GAS TREATMENT DEVICE AND CO2 RECOVERY DEVICE USING SAME

(71) Applicant: Mitsubishi Heavy Industries Engineering, Ltd., Kanagawa (JP)

(72) Inventors: Hiroshi Tanaka, Tokyo (JP); Takuya Hirata, Tokyo (JP); Takashi Kamijo, Tokyo (JP); Tatsuya Tsujiuchi, Tokyo (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 284 days.

(21) Appl. No.: 16/321,738

(22) PCT Filed: Jan. 24, 2018

(86) PCT No.: PCT/JP2018/002103
§ 371 (c)(1),
(2) Date: Jan. 29, 2019

(87) PCT Pub. No.: WO2018/139482
PCT Pub. Date: Aug. 2, 2018

(65) Prior Publication Data
US 2019/0160420 A1    May 30, 2019

(30) Foreign Application Priority Data
Jan. 24, 2017  (JP) .............................. JP2017-010650

(51) Int. Cl.
*B01D 51/10*  (2006.01)
*B01D 53/18*  (2006.01)
(Continued)

(52) U.S. Cl.
CPC ......... *B01D 53/1418* (2013.01); *B01D 51/10* (2013.01); *B01D 53/145* (2013.01);
(Continued)

(58) Field of Classification Search
CPC ........ B01D 2251/304; B01D 2251/604; B01D 2252/20431; B01D 2257/404;
(Continued)

(56) References Cited

U.S. PATENT DOCUMENTS

2013/0142715 A1  6/2013  Nagayasu et al.
2015/0125353 A1  5/2015  Oishi et al.
2015/0209724 A1*  7/2015  Ogawa ................... B01D 53/78
                                                       423/242.7

FOREIGN PATENT DOCUMENTS

JP   2013-202523 A   10/2013
JP   2013-244454 A   12/2013
JP   2015-193005 A   11/2015

OTHER PUBLICATIONS

Office Action in corresponding Indian Application No. 201917002919, dated Nov. 11, 2019 (5 pages).
(Continued)

*Primary Examiner* — Cabrena Holecek
(74) *Attorney, Agent, or Firm* — Osha Bergman Watanabe & Burton LLP

(57) ABSTRACT

A nitrogen oxide absorbing unit, a nitrogen oxide absorbing liquid extraction line, a nitrogen oxide absorbing liquid heating/regenerating unit, a released gas line, and a regenerated liquid discharge line are provided. The nitrogen oxide absorbing unit is configured to absorb and remove nitrogen oxides in exhaust gas with nitrogen oxide absorbing liquid by introducing the exhaust gas containing nitrogen oxides and carbon dioxide. Through the nitrogen oxide absorbing liquid extraction line, the circulating nitrogen oxide absorbing liquid is extracted from a nitrogen oxide absorbing liquid circulation line. The nitrogen oxide absorbing liquid heating/regenerating unit is configured to obtain released gas containing at least nitrogen monoxide and carbon dioxide and nitrogen oxide absorbing liquid regenerated liquid by
(Continued)

subjecting the nitrogen oxide absorbing liquid to heating and regeneration treatment. Through the released gas line, exhaust gas from the nitrogen oxide absorbing unit is introduced to the released gas.

10 Claims, 6 Drawing Sheets

(51) Int. Cl.
    *B01D 53/56*     (2006.01)
    *B01D 53/78*     (2006.01)
    *B01D 53/96*     (2006.01)
    *B01D 53/62*     (2006.01)
    *C01B 32/50*     (2017.01)
    *B01D 53/14*     (2006.01)

(52) U.S. Cl.
    CPC ..... *B01D 53/1406* (2013.01); *B01D 53/1425* (2013.01); *B01D 53/1456* (2013.01); *B01D 53/1475* (2013.01); *B01D 53/18* (2013.01); *B01D 53/56* (2013.01); *B01D 53/62* (2013.01); *B01D 53/78* (2013.01); *B01D 53/96* (2013.01); *C01B 32/50* (2017.08); *B01D 2251/304* (2013.01); *B01D 2251/604* (2013.01); *B01D 2252/20431* (2013.01); *B01D 2257/404* (2013.01); *B01D 2258/0283* (2013.01); *Y02C 20/40* (2020.08); *Y02P 20/151* (2015.11)

(58) Field of Classification Search
    CPC ............ B01D 2258/0283; B01D 51/10; B01D 53/1406; B01D 53/1418; B01D 53/1425; B01D 53/145; B01D 53/1456; B01D 53/1475; B01D 53/18; B01D 53/56; B01D 53/62; B01D 53/78; B01D 53/96; C01B 32/50; Y02C 20/40; Y02P 20/151
    See application file for complete search history.

(56) References Cited

OTHER PUBLICATIONS

Extended European Search Report in corresponding European Application No. 18743953.4, dated Aug. 14, 2019 (8 pages).

\* cited by examiner

EXHAUST GAS TREATMENT DEVICE AND CO2 RECOVERY DEVICE USING SAME

TECHNICAL FIELD

The present invention relates to an exhaust gas treatment device and a $CO_2$ recovery device using the exhaust gas treatment device, which suppress degradation of $CO_2$ absorbing liquid in treatment for recovering and removing $CO_2$ in exhaust gas.

BACKGROUND ART

In order to remove $CO_2$ from combustion exhaust gas (hereinafter referred to as "exhaust gas") generated from combustion equipment (for example, a boiler and a gas turbine), the following technology has been proposed. That is, the exhaust gas is drawn to a $CO_2$ absorbing column, and is brought into contact with $CO_2$ absorbing liquid so that the $CO_2$ absorbing liquid absorbs $CO_2$ in the exhaust gas. The $CO_2$ absorbing liquid having absorbed $CO_2$ is sent to an absorbing liquid regeneration column, and is heated with steam generated from a reboiler. Accordingly, $CO_2$ is released, and $CO_2$ having high purity is recovered. Also, the $CO_2$ absorbing liquid is regenerated, and is sent to the $CO_2$ absorbing column. In this manner, the $CO_2$ absorbing liquid is circulated and reused.

Further, for example, in a case where nitrogen dioxide ($NO_2$) is contained in the exhaust gas exhausted from the combustion equipment, there is a problem in that components caused by $NO_2$ in the exhaust gas is accumulated in the $CO_2$ absorbing liquid. With this problem, frequency of a reclaiming operation for removing the accumulated components and regenerating the $CO_2$ absorbing liquid is increased, and operation cost is increased. As a countermeasure, there has been proposed a process for removing nitrogen oxides by installing a nitrogen oxide removing device, which removes nitrogen oxides in the exhaust gas, on upstream of the $CO_2$ recovery device (Patent Document 1). Further, there has also been proposed a process for removing nitrogen oxides and sulfur oxides in the exhaust gas by an amine compound and performing decomposition treatment (Patent Document 2).

CITATION LIST

Patent Documents

Patent Document 1: JP 2013-244454 A
Patent Document 2: JP 2013-202523 A

SUMMARY OF INVENTION

Problem to be Solved by the Invention

However, in the case where nitrogen oxides are removed through use of the amine compound as proposed in Patent Document 2, nitrate ions and nitrite ions in absorbing liquid having absorbed nitrogen oxides need to be decomposed through use of amidosulfuric acid in a nitrogen component removing tank, and the absorbing liquid needs to be disposed, which leads to a problem in that a waste amount is increased.

Further, in a case of the exhaust gas treatment device in which the nitrogen oxide removing device is not installed on upstream of the $CO_2$ recovery device or in a case where an amount of $NO_2$ generated in the exhaust gas is increased due to, for example, fluctuation of an operation state of the combustion device such as a gas turbine, the frequency of the reclaiming treatment for removing the accumulated components caused by $NO_2$ in the $CO_2$ recovery device is increased. Thus, there arises a problem in that operation cost is increased.

In view of the above-mentioned problems, the present invention has an object to provide an exhaust gas treatment device and a $CO_2$ recovery device using the exhaust gas treatment device, which are capable of reusing nitrogen oxide absorbing liquid at the time of removing nitrogen oxides in exhaust gas and of reducing a ratio of a residue at the time of regeneration treatment.

Solution to Problem

In order to solve the above-mentioned problems, according to a first aspect of the present invention, an exhaust gas treatment device includes a nitrogen oxide absorbing unit, an exhaust gas discharge line, a nitrogen oxide absorbing liquid circulation line, a nitrogen oxide absorbing liquid extraction line, a nitrogen oxide absorbing liquid heating/regenerating unit, a released gas line, and a regenerated liquid discharge line. The nitrogen oxide absorbing unit is configured to absorb and remove nitrogen oxides in exhaust gas with nitrogen oxide absorbing liquid by introducing the exhaust gas, which is discharged from a combustion device and contains at least nitrogen oxides and carbon dioxide. Through the exhaust gas discharge line, treated exhaust gas, which is obtained by removing nitrogen oxides in the exhaust gas, is discharged. Through the nitrogen oxide absorbing liquid circulation line, the nitrogen oxide absorbing liquid is circulated, and the nitrogen oxide absorbing liquid circulation line connects a bottom part and a top part of the nitrogen oxide absorbing unit. Through the nitrogen oxide absorbing liquid extraction line, the circulating nitrogen oxide absorbing liquid is extracted, and the nitrogen oxide absorbing liquid extraction line is branched from the nitrogen oxide absorbing liquid circulation line. The nitrogen oxide absorbing liquid heating/regenerating unit is configured to obtain released gas containing at least nitrogen monoxide and carbon dioxide and nitrogen oxide absorbing liquid regenerated liquid by subjecting the extracted nitrogen oxide absorbing liquid to heating and regeneration treatment. Through the released gas line, the released gas is introduced from the nitrogen oxide absorbing liquid heating/regenerating unit to the exhaust gas discharge line. Through the regenerated liquid discharge line, the nitrogen oxide absorbing liquid regenerated liquid is introduced from the nitrogen oxide absorbing liquid heating/regenerating unit to the nitrogen oxide absorbing liquid circulation line.

In the first aspect of the present invention, with the exhaust gas treatment device in a second aspect of the present invention, the nitrogen oxide absorbing liquid heating/regenerating unit includes an alkaline agent supply unit configured to supply an alkaline agent.

In the first aspect or the second aspect of the present invention, with the exhaust gas treatment device in a third aspect of the present invention, the nitrogen oxide absorbing liquid heating/regenerating unit includes a first reclaimer and a first gas-liquid separation device. The first reclaimer is configured to heat the nitrogen oxide absorbing liquid, which is extracted, indirectly with steam. The first gas-liquid separation device is configured to separate the nitrogen oxide absorbing liquid regenerated liquid and the released gas in released steam, and is provided to a released steam line for releasing the released steam from the first reclaimer.

In the first aspect or the second aspect of the present invention, with the exhaust gas treatment device in a fourth aspect of the present invention, the nitrogen oxide absorbing liquid heating/regenerating unit is a nitrogen oxide absorbing liquid regenerating column including a reboiler configured to heat the extracted nitrogen oxide absorbing liquid indirectly with the steam. The nitrogen oxide absorbing liquid regenerating column includes a second gas-liquid separation device configured to separate the nitrogen oxide absorbing liquid regenerated liquid and the released gas in the released steam. The second gas-liquid separation device is provided in a released steam line for releasing the released steam containing NO and $CO_2$ from a top part of the nitrogen oxide absorbing liquid regenerating column.

In the fourth aspect of the present invention, the exhaust gas treatment device in a fifth aspect of the present invention further includes a second reclaimer configured to obtain released gas containing at least nitrogen monoxide and carbon dioxide and the nitrogen oxide absorbing liquid regenerated liquid by subjecting the nitrogen oxide absorbing liquid regenerated liquid, which is extracted from a bottom part of the nitrogen oxide absorbing liquid regenerating column, to heating and regeneration treatment.

In the first aspect to the fifth aspect of the present invention, with the exhaust gas treatment device in a sixth aspect of the present invention, the nitrogen oxide absorbing liquid is an amine solution containing tertiary amine or an alkaline solution.

According to a seventh aspect of the present invention, a $CO_2$ recovery device includes the exhaust gas treatment device of any one of the first aspect to the sixth aspect of the present invention, a $CO_2$ absorbing column, a $CO_2$ absorbing liquid regenerating column, a rich solution supply line, a lean solution supply line, and a third reclaimer. The $CO_2$ absorbing column is configured to remove $CO_2$ by bringing $CO_2$ in exhaust gas, which is introduced through an exhaust gas discharge line and mixed with the released gas, and $CO_2$ absorbing liquid into contact with each other. The $CO_2$ absorbing liquid regenerating column is configured to regenerate a rich solution having absorbed $CO_2$ with steam of a reboiler. Through the rich solution supply line, the rich solution is extracted from the $CO_2$ absorbing column and is introduced to the $CO_2$ absorbing liquid regenerating column side. Through the lean solution supply line, a lean solution is extracted from the $CO_2$ absorbing liquid regenerating column, is introduced to the $CO_2$ absorbing column, and is reused as the $CO_2$ absorbing liquid. The lean solution is regenerated in the $CO_2$ absorbing liquid regenerating column, and $CO_2$ is released from the lean solution. The third reclaimer is configured to regenerate the lean solution by extracting the lean solution from the lean solution supply line.

In the seventh aspect of the present invention, the $CO_2$ recovery device in an eighth aspect of the present invention further includes a released gas branch line for introducing part of the released gas to a bottom part of the $CO_2$ absorbing liquid regenerating column. The released gas branch line is branched from the released gas line.

In the seventh aspect or the eighth aspect of the present invention, the $CO_2$ recovery device in a ninth aspect of the present invention further includes a reclaimer discharge liquid introduction line for extracting reclaimer discharge liquid from a bottom part of the third reclaimer and introducing the reclaimer discharge liquid to extracted liquid of the nitrogen oxide absorbing liquid.

In the seventh aspect to the ninth aspect of the present invention, with the $CO_2$ recovery device in a tenth aspect of the present invention, the $CO_2$ absorbing liquid and the nitrogen oxide absorbing liquid have at least one common component as an absorbing liquid component.

Advantageous Effect of Invention

According to the present invention, nitrogen oxides in the exhaust gas are removed with the nitrogen oxide absorbing liquid, and the nitrogen oxide absorbing liquid having absorbed nitrogen oxides is heated and regenerated. In this manner, the nitrogen oxide absorbing liquid can be reused. Further, at the time of heating and regeneration, nitrites in the nitrogen oxide absorbing liquid are released as nitrogen monoxide (NO). Thus, a ratio of a residue at the time of regeneration treatment can be reduced.

DESCRIPTION OF EMBODIMENTS

Now, with reference to the accompanying drawings, embodiments of the present invention are described in detail. Note that, the present invention is not limited by those embodiments, and when a plurality of embodiments are given, the present invention is intended to include a configuration combining those embodiments.

First Embodiment

Figure 1:
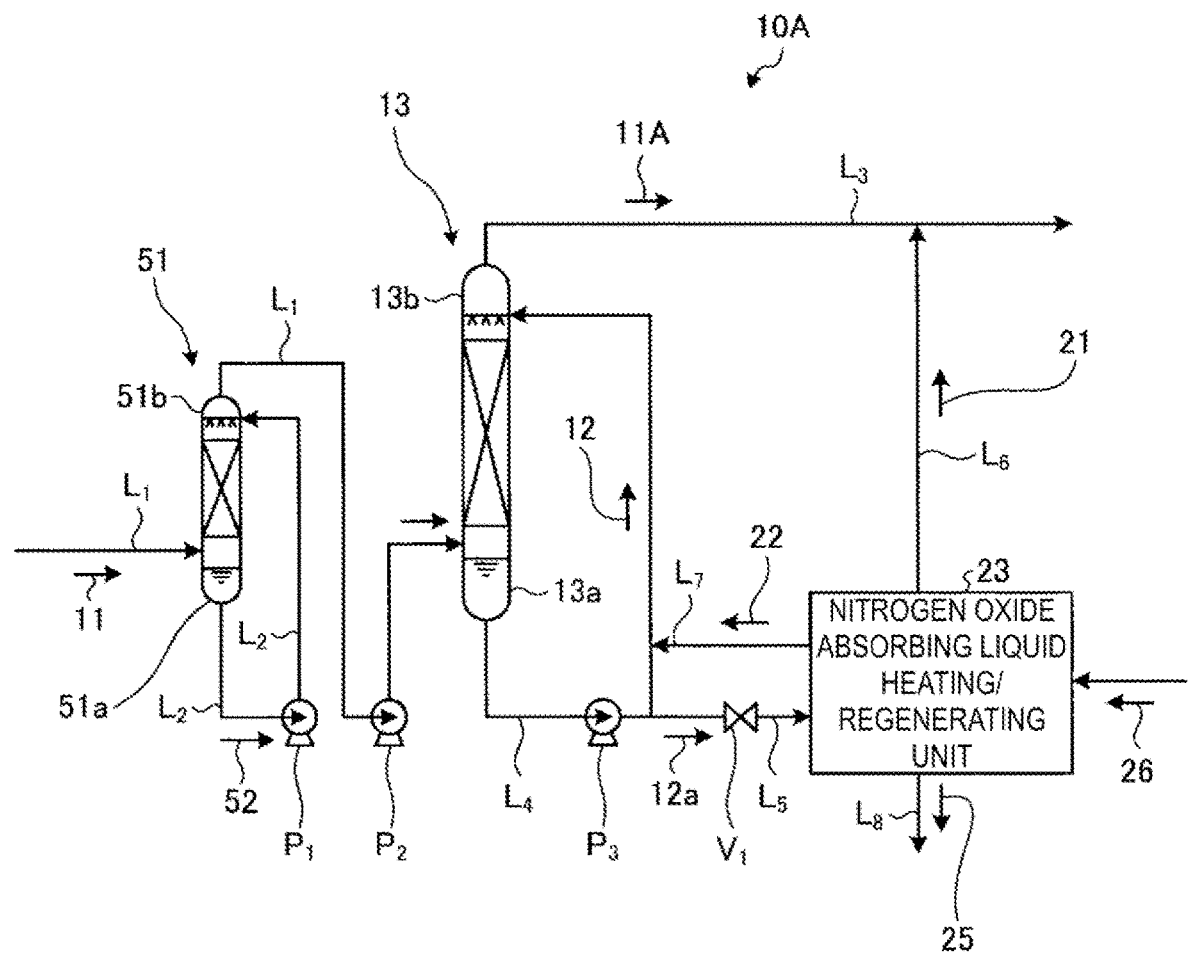
FIG. 1 is a schematic diagram of an exhaust gas treatment device according to a first embodiment of the present invention.

FIG. 1 is a schematic diagram of an exhaust gas treatment device according to a first embodiment of the present invention. As illustrated in FIG. 1, an exhaust gas treatment device 10A according to this embodiment includes a nitrogen oxide absorbing unit 13, an exhaust gas discharge line $L_3$, a nitrogen oxide absorbing liquid circulation line $L_4$, a nitrogen oxide absorbing liquid extraction line $L_5$, a nitrogen oxide absorbing liquid heating/regenerating unit 23, a released gas line $L_6$, and a regenerated liquid discharge line $L_7$. The nitrogen oxide absorbing unit 13 includes an exhaust gas introduction line $L_1$ for introducing exhaust gas 11, which is discharged from a combustion device (not shown) and contains at least nitrogen oxides ($NO_x$) and carbon dioxide ($CO_2$). The nitrogen oxide absorbing unit 13 is configured to absorb and remove nitrogen oxides in the exhaust gas 11 with nitrogen oxide absorbing liquid (first absorbing liquid) 12. Through the exhaust gas discharge line $L_3$, the exhaust gas 11A obtained by removing nitrogen oxides in the exhaust gas 11 is discharged. The nitrogen oxide absorbing liquid circulation line $L_4$ connects a bottom part 13a and a top part 13b of the nitrogen oxide absorbing unit 13, and nitrogen oxide absorbing liquid 12 is circulated through the nitrogen oxide absorbing liquid circulation line $L_4$. The nitrogen oxide absorbing liquid extraction line $L_5$ is branched from the nitrogen oxide absorbing liquid circulation line $L_4$, and part 12a of the circulating nitrogen oxide absorbing liquid 12 is extracted through the nitrogen oxide absorbing liquid extraction line $L_5$. The nitrogen oxide absorbing liquid heating/regenerating unit 23 heats and regenerates the extracted nitrogen oxide absorbing liquid 12, and then obtains released gas 21 containing at least nitrogen monoxide (NO) and carbon dioxide ($CO_2$) and nitrogen oxide absorbing liquid regenerated liquid (first regenerated liquid) 22. The released gas line $L_6$ connects the nitrogen oxide absorbing liquid heating/regenerating unit 23 and the exhaust gas discharge line $L_3$, and the released gas 21 is introduced from the nitrogen oxide absorbing liquid heating/regenerating unit 23 to the exhaust gas discharge line $L_3$ through the released gas line $L_6$. The regenerated liquid discharge line $L_7$ connects the nitrogen oxide absorbing liquid heating/regenerating unit 23 and the nitrogen oxide absorbing liquid circulation line $L_4$, and nitrogen oxide absorbing liquid regenerated liquid 22 is introduced from the nitrogen oxide absorbing liquid heating/regenerating unit 23 to the nitrogen oxide absorbing liquid circulation line $L_4$ through the regenerated liquid discharge line $L_7$.

In this embodiment, in the middle of the exhaust gas introduction line $L_1$ for introducing the exhaust gas 11 to the nitrogen oxide absorbing unit 13, an exhaust gas cooling column 51 for cooling the exhaust gas 11 is provided. The exhaust gas 11 is cooled in advance with cooling water 52 circulating through a circulation line $L_2$ connected from a bottom part 51a to a top part 51b of the exhaust gas cooling column 51. Here, in FIG. 1, liquid delivery pumps for supplying solution are indicated with the reference symbols $P_1$ to $P_3$.

In a method of recovering nitrogen oxides ($NO_x$) in the exhaust gas 11 containing $NO_x$ and $CO_2$ through use of the nitrogen oxide absorbing unit 13, first, the exhaust gas 11 containing $NO_x$, which is generated from the combustion device (not shown) such as a gas turbine, is sent to the exhaust gas cooling column 51, is cooled with the circulating cooling water 52 at this state, and is sent to the nitrogen oxide absorbing unit 13.

In the nitrogen oxide absorbing unit 13, the exhaust gas 11 is brought into counterflow contact with the nitrogen oxide absorbing liquid 12, and nitrogen oxides in the exhaust gas 11 are absorbed by the nitrogen oxide absorbing liquid 12 as a result of a chemical reaction. With this chemical reaction, nitrogen oxides are turned to nitrates ($HNO_3^-$) and nitrites ($HNO_2^-$).

The exhaust gas 11A obtained by removing nitrogen oxides in the nitrogen oxide absorbing unit 13 is discharged to an outside of the system through the exhaust gas discharge line $L_3$ connected to the top part 13b of the nitrogen oxide absorbing unit 13.

Further, the nitrogen oxide absorbing liquid 12 is circulated and reused through the nitrogen oxide absorbing liquid circulation line $L_4$, and nitrogen oxides in the exhaust gas 11 are absorbed and removed. Then, when the accumulated amount of nitrogen oxides in the nitrogen oxide absorbing liquid 12 is a predetermined amount (for example, a case where nitrite ion concentration exceeds a predetermined threshold value), the part 12a of the nitrogen oxide absorbing liquid 12 circulating from the nitrogen oxide absorbing liquid circulation line $L_4$ is extracted from the nitrogen oxide absorbing liquid extraction line $L_5$. This extraction is performed by opening and closing a valve $V_1$ provided to the nitrogen oxide absorbing liquid extraction line $L_5$.

The extracted nitrogen oxide absorbing liquid 12 is guided to the nitrogen oxide absorbing liquid heating/regenerating unit 23, is heated by a heat source at this state, and then is subjected to gas-liquid separation treatment. In this manner, the nitrogen oxide absorbing liquid 12 is regenerated.

The nitrogen oxide absorbing liquid heating/regenerating unit 23 is not particularly limited as long as nitrogen oxides accumulated in the nitrogen oxide absorbing liquid 12 can be heated and released. For example, a regenerating column including a distillation column, a reclaimer, and reboiler may be exemplified.

Further, at least nitrogen monoxide (NO) is contained in the released gas 21 separated from steam released through heating treatment in the nitrogen oxide absorbing liquid heating/regenerating unit 23 at the time of regeneration. Note that, in a case where the nitrogen oxide absorbing liquid 12 has a $CO_2$ recovery function, carbon dioxide ($CO_2$) is also contained in the released gas 21 at the same time.

The released gas 21 is introduced in the exhaust gas 11A from which nitrogen oxides are removed in the nitrogen oxide absorbing unit 13, through the released gas line $L_6$ having a distal end connected to the exhaust gas discharge line $L_3$, and is discharged to the outside of the system.

Meanwhile, the nitrogen oxide absorbing liquid regenerated liquid 22 from the nitrogen oxide absorbing liquid heating/regenerating unit 23 is introduced in the circulating nitrogen oxide absorbing liquid 12 through the regenerated liquid discharge line $L_7$ connected to the nitrogen oxide absorbing liquid circulation line $L_4$, and is reused as the nitrogen oxide absorbing liquid 12.

A residue 25 obtained after heating treatment performed in the nitrogen oxide absorbing liquid heating/regenerating unit 23 is discharged through a residue discharge line $L_8$, and is treated separately. Note that, makeup water 26 is separately supplied to the nitrogen oxide absorbing liquid heating/regenerating unit 23, and prevents density of the solution in the nitrogen oxide absorbing liquid heating/regenerating unit 23 from being increased.

Here, the nitrogen oxide absorbing liquid 12 for removing nitrogen oxides in the exhaust gas 11 is not particularly limited as long as nitrogen oxides in the exhaust gas 11 are absorbed and removed. However, it is preferred that an amine solution including tertiary amine or an alkaline solution be used. Here, the reason for using the tertiary amine is as follows. That is, in a case where primary amine or secondary amine is used, reaction by-products with nitrogen oxides are generated, and amine is lost, which is not preferred.

Here, as specific examples of the tertiary amine, there are exemplified N-methyldiethanolamine, N-ethyldiethanolamine, N-butyldiethanolamine, 2-dimethylaminoethanol, 2-diethylaminoethanol, N,N-Dibutylethanolamine, N-ethyl-N-methylethanolamine, 3-dimethylamino-1-propanol, 2-dimethylamino-2-methyl-1-propanol, and 4-dimethylamino-1-butanol. However, the present invention is not limited thereto.

Further, the tertiary amine, and the primary amine and the secondary amine, may be used in combination. Also in this case, it is preferred that the tertiary amine compound be a main component and that a combination ratio of the tertiary amine to the entire amine be 55 wt % to 95 wt %. It is further preferred that the combination ratio fall within a range of from 60 wt % to 80 wt %.

Further, in a case where an alkaline solution is used, it is preferred that sodium hydroxide solution be used to maintain a pH value equal to or lower than 6 as a pH value at the time of circulation. The sodium hydroxide solution has alkaline concentration of about 5% to 48%, more preferably 10% to 25%. This is because, when the pH value of the circulating liquid is high, an absorbing amount of $CO_2$ is increased excessively, which is disadvantageous in terms of an alkaline consumption amount and energy efficiency.

A compressor such as a vacuum pump is provided to the released gas line $L_6$ through which the released gas 21 is released from the nitrogen oxide absorbing liquid heating/regenerating unit 23. With this, an internal pressure of the nitrogen oxide absorbing liquid heating/regenerating unit 23 is reduced so that a boiling point of the solution is lowered. Note that, in a case where the boiling point falls within a specified range, the compressor may not be provided.

Here, the extracted nitrogen oxide absorbing liquid 12 is heated in the nitrogen oxide absorbing liquid heating/regenerating unit 23. Accordingly, nitrites in the nitrogen oxide absorbing liquid 12 are released in the released steam as nitrogen monoxide (NO), which is less likely to be dissolved in the absorbing liquid.

As described above, in this embodiment which includes the nitrogen oxide absorbing liquid heating/regenerating unit 23, nitrites in the nitrogen oxide absorbing liquid 12 are released as nitrogen monoxide (NO) through heating, and do not remain in the nitrogen oxide absorbing liquid 12. Thus, a discharge amount of the residue 25 is reduced to 70% as compared to a case where the accumulated amount of nitrogen oxides in the nitrogen oxide absorbing liquid 12 is decomposed with the related-art device, which decomposes the nitrogen oxide absorbing liquid but does not have a nitrogen oxide absorbing liquid heating/regenerating step.

Second Embodiment

Figure 2:
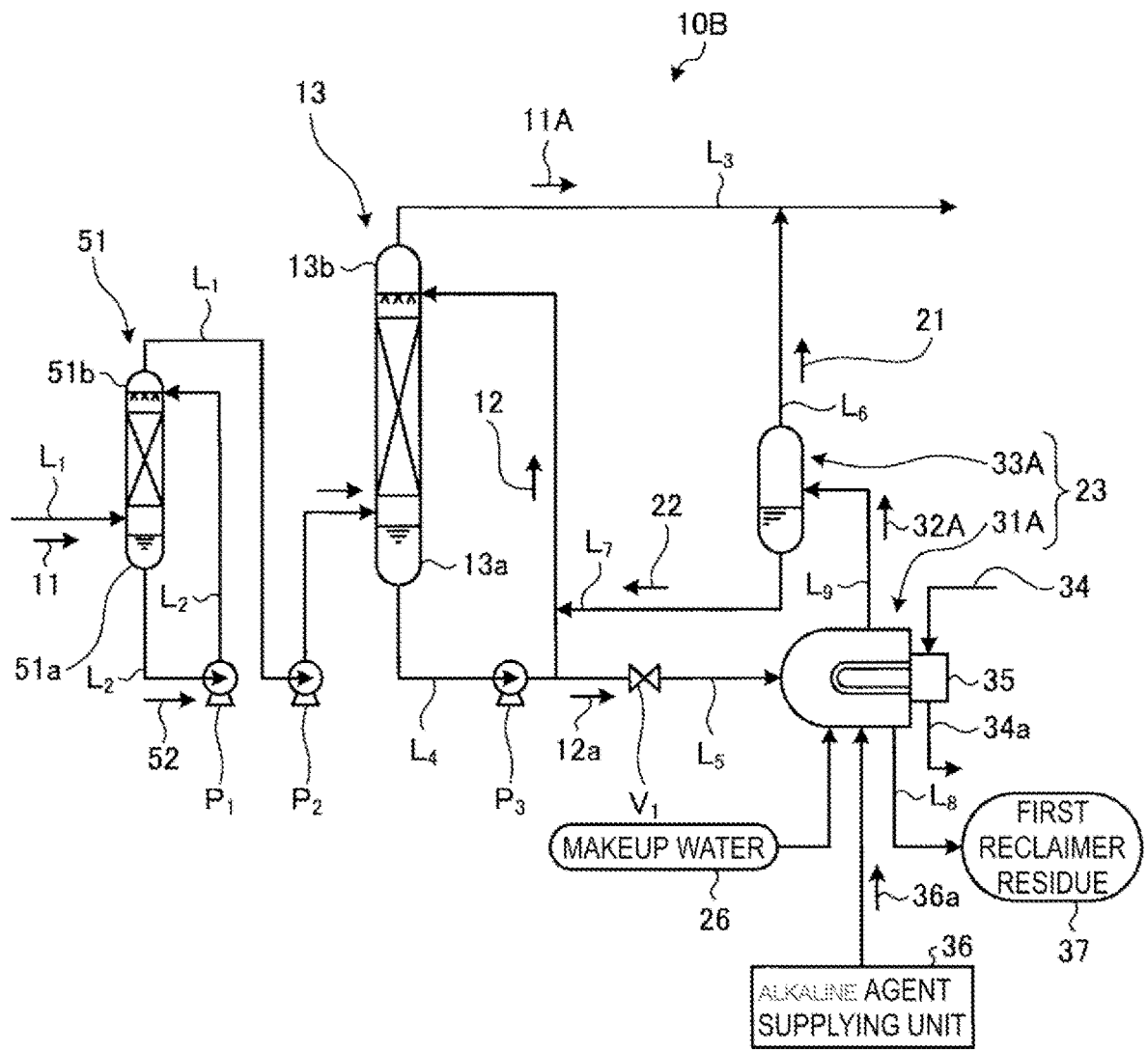
FIG. 2 is a schematic diagram of an exhaust gas treatment device according to a second embodiment of the present invention.

FIG. 2 is a schematic diagram of an exhaust gas treatment device according to a second embodiment of the present invention. Note that, members that are the same as those in the first embodiment are given the same reference symbols, and description thereof is omitted. As illustrated in FIG. 2, in an exhaust gas treatment device 10B according to this embodiment, the nitrogen oxide absorbing liquid heating/regenerating unit 23 in the exhaust gas treatment device 10A according to the first embodiment includes a first reclaimer 31A and a first gas-liquid separation device 33A. The first reclaimer 31A heats the extracted nitrogen oxide absorbing liquid 12a indirectly with steam 34. The first gas-liquid separation device 33A is provided to a released steam line $L_9$ through which a first released steam 32A is released from the first reclaimer 31A, and separates the nitrogen oxide absorbing liquid regenerated liquid 22 and the released gas 21 from each other in the first released steam 32A. Further, a heating unit 35 and an alkaline agent supply unit 36 are provided to the first reclaimer 31A. The heating unit 35 heats an inside indirectly with the steam 34. The alkaline agent supply unit 36 supplies an alkaline agent 36a to the inside. In FIG. 2, steam condensation water after heat exchange is indicated with the reference symbol 34a.

In this embodiment, returned water from a $CO_2$ recovery device (not shown) is introduced as the makeup water 26, and the extracted nitrogen oxide absorbing liquid 12a is mixed and diluted with the alkaline agent 36a. The reason for this is as follows. That is, because the $CO_2$ recovery device is a closed system, water balance is degraded when water is introduced from the outside for dilution.

As described above, the alkaline agent (for example, NaOH and KOH) 36a is adjusted and added to the nitrogen oxide absorbing liquid (containing amine nitrate) 12. Accordingly, sodium sulfate or potassium sulfate is obtained, and amine is turned from an ion state to a free state. Amine in the free state has a steam pressure, and hence is contained in the first released steam 32A as a gasified body. Then, amine is separated from the liquid in the first gas-liquid separation device 33A, and is recovered. Note that, ion in the ion state does not have a steam pressure, and hence is not contained in the first released steam 32A.

A co-existing substance, which is fixed by the added alkaline agent 36a and does not have the steam pressure, is discharged as a first reclaimer residue 37 from a bottom part of the first reclaimer 31A through the residue discharge line $L_8$, and is treated separately.

Further, the first released steam 32A is introduced from the first reclaimer 31A to the first gas-liquid separation device 33A, and is separated into the nitrogen oxide absorbing liquid regenerated liquid 22 and the released gas 21 from the first released steam 32A.

The separated released gas 21 is supplied in the exhaust gas 11A from which nitrogen oxides are removed in the nitrogen oxide absorbing unit 13, through the released gas line $L_6$ having the distal end connected to the exhaust gas discharge line $L_3$, and is discharged to the outside of the system.

Note that, a compressor such as a vacuum pump is provided to the released gas line $L_6$ through which the released gas 21 is released from the first gas-liquid separation device 33A. With this, an internal pressure of the first reclaimer 31A is reduced so that the boiling point of the solution is lowered. Note that, in a case where the boiling point falls within a specified range, the compressor may not be provided.

Meanwhile, the nitrogen oxide absorbing liquid regenerated liquid (first regenerated liquid) 22, which is separated from the gas, is mixed in the circulating nitrogen oxide absorbing liquid 12 through the regenerated liquid discharge line $L_7$ having a distal end connected to the nitrogen oxide absorbing liquid circulation line $L_4$, and is reused as the nitrogen oxide absorbing liquid 12.

According to this embodiment, in the first reclaimer 31A as the nitrogen oxide absorbing liquid heating/regenerating unit 23, nitrites in the nitrogen oxide absorbing liquid 12 are released as nitrogen monoxide (NO) through indirect heating of the steam, and do not remain in the nitrogen oxide absorbing liquid 12. Thus, the discharge amount of the residue is reduced to 70% as compared to the case where the accumulated amount of nitrogen oxides in the nitrogen oxide absorbing liquid 12 is decomposed with the related-art device, which decomposes the nitrogen oxide absorbing liquid but does not have a nitrogen oxide absorbing liquid heating/regenerating step.

Further, nitrites ($NO_2^-$) obtained by a reaction of nitrogen oxides absorbed in the nitrogen oxide absorbing liquid 12 is released, and is removed as NO. Thus, through the heating, the accumulated amount of nitrogen oxides is reduced, and the waste amount of the first reclaimer residue 37, which is generated through reclaiming by adding the alkaline agent 36a in the first reclaimer 31A, is reduced.

Third Embodiment

Figure 3:
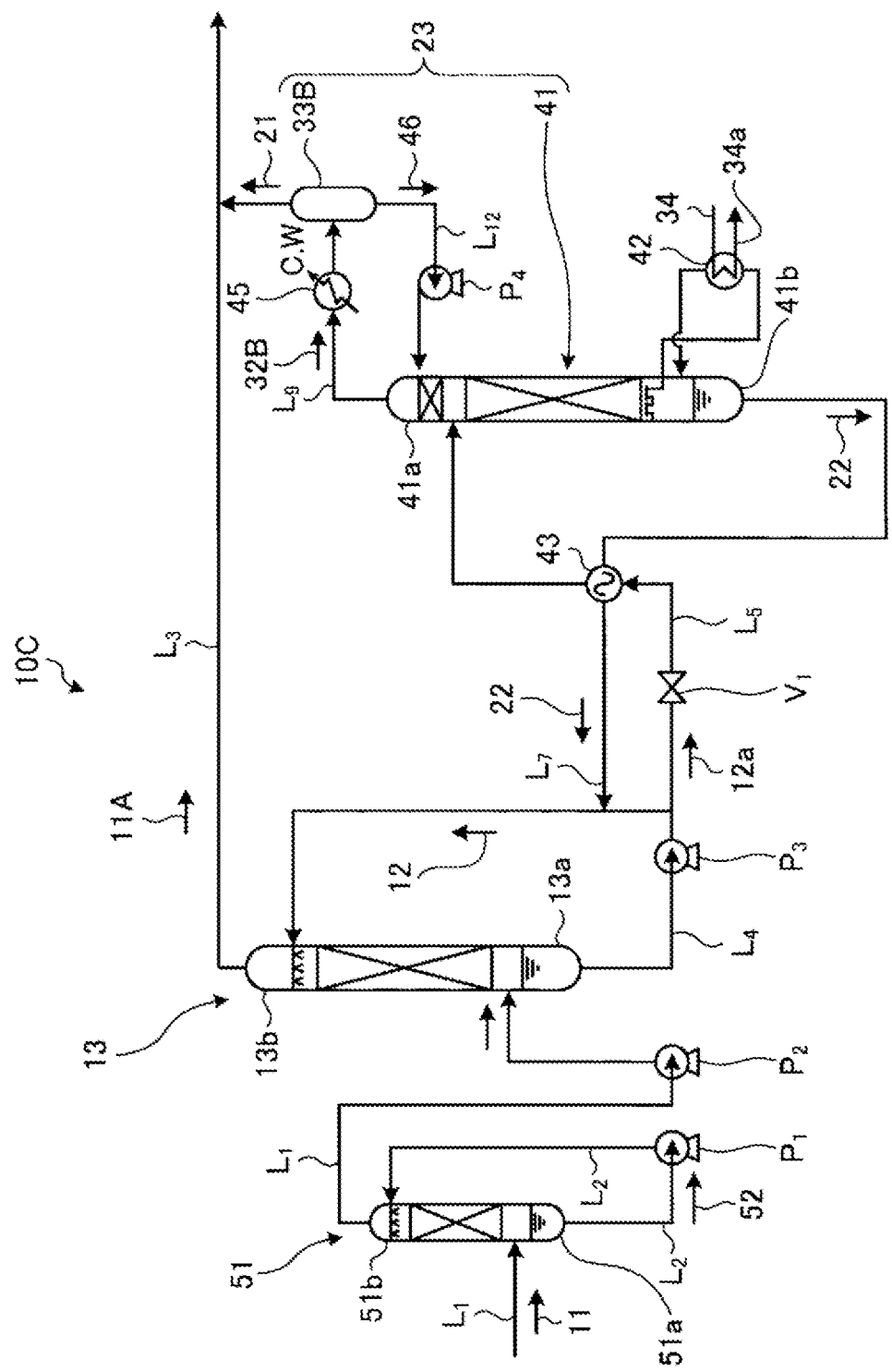
FIG. 3 is a schematic diagram of an exhaust gas treatment device according to a third embodiment of the present invention.

FIG. 3 is a schematic diagram of an exhaust gas treatment device according to a third embodiment of the present invention. Note that, members that are the same as those in the first embodiment and the second embodiment are given the same reference symbols, and description thereof is omitted. As illustrated in FIG. 3, in an exhaust gas treatment device 10C according to this embodiment, the nitrogen oxide absorbing liquid heating/regenerating unit 23 in the exhaust gas treatment device 10A according to the first embodiment includes a nitrogen oxide absorbing liquid regenerating column 41 and a second gas-liquid separation device 33B. The nitrogen oxide absorbing liquid regenerating column 41 heats the extracted nitrogen oxide absorbing liquid 12a indirectly with steam of a reboiler 42. The second gas-liquid separation device 33B separates the released gas 21 from a second released steam 32B released from a top part 41a of the nitrogen oxide absorbing liquid regenerating column 41.

In this embodiment, the nitrogen oxide absorbing liquid heating/regenerating unit 23 extracts the part 12a of the circulating nitrogen oxide absorbing liquid 12 from the nitrogen oxide absorbing liquid circulation line $L_4$ through the nitrogen oxide absorbing liquid extraction line $L_5$. A distal end of the nitrogen oxide absorbing liquid extraction line $L_5$ is introduced to the inside from the top part 41a of the nitrogen oxide absorbing liquid regenerating column 41, and nitrogen monoxide (NO) and carbon dioxide ($CO_2$) are released with the steam heated indirectly by the reboiler 42. In this manner, regeneration treatment is performed.

Further, a first heat exchanger 43 is located at a crossing part between the nitrogen oxide absorbing liquid extraction line $L_5$ and the regenerated liquid discharge line $L_7$ which introduces the nitrogen oxide absorbing liquid regenerated liquid 22 extracted from a bottom part 41b of the nitrogen oxide absorbing liquid regenerating column 41 to the nitrogen oxide absorbing liquid circulation line $L_4$. The nitrogen oxide absorbing liquid regenerated liquid 22 heats the extracted nitrogen oxide absorbing liquid 12a. This extraction is performed by opening and closing the valve $V_1$ provided to the nitrogen oxide absorbing liquid extraction line $L_5$.

Further, in this embodiment, a first cooler 45 is provided to the released steam line $L_9$ through which the second released steam 32B is released. The second released steam 32B is cooled, and steam is condensed. After that, the resultant is introduced to the second gas-liquid separation device 33B. The condensed water is returned as returned water 46 to the top part 41a of the nitrogen oxide absorbing liquid regenerating column 41 via the pump $P_4$ through a returned water line $L_{12}$.

According to this embodiment, in the nitrogen oxide absorbing liquid regenerating column 41 as the nitrogen oxide absorbing liquid heating/regenerating unit 23, through indirect heating with steam by the reboiler 42, nitrites in the nitrogen oxide absorbing liquid 12, which flows down an inside of the column, are released as nitrogen monoxide (NO), and do not remain in the nitrogen oxide absorbing liquid 12.

Figure 4:
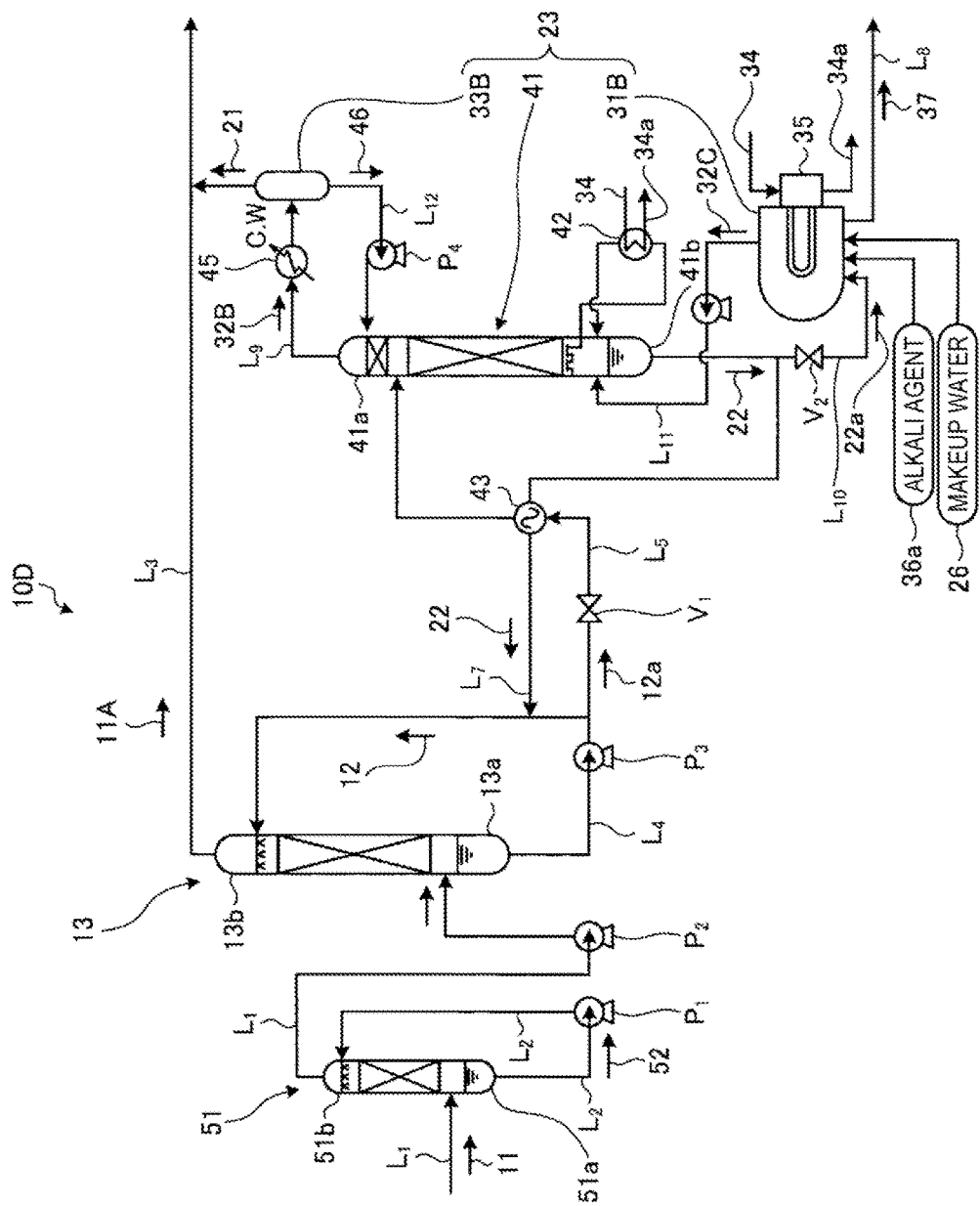
FIG. 4 is a schematic diagram of another exhaust gas treatment device according to the third embodiment.

FIG. 4 is a schematic diagram of another exhaust gas treatment device according to the third embodiment. Note that, members that are the same as those in the first embodiment to the third embodiment are given the same reference symbols, and description thereof is omitted. As illustrated in FIG. 4, an exhaust gas treatment device 10D according to this embodiment is provided with a second reclaimer 31B, which extracts part 22a of the regenerated nitrogen oxide absorbing liquid regenerated liquid 22 through a regenerated liquid extraction line $L_{10}$ and performs regeneration treatment, so that impurities accumulated in the nitrogen oxide absorbing liquid regenerated liquid 22 are separated and removed. This extraction is performed by opening and closing a valve $V_2$ provided to the regenerated liquid extraction line $L_{10}$. Note that, the second reclaimer 31B is provided with the heating unit 35, which heats the inside indirectly with the steam 34, and the makeup water 26 and the alkaline agent 36a are supplied to the inside.

In the second reclaimer 31B, the co-existing substances such as amine having the steam pressure is contained in a third released steam 32C. Thus, the co-existing substances in an air state are returned to the bottom part of the nitrogen oxide absorbing liquid regenerating column 41 through a third released steam line $L_{11}$. Nitrates in the nitrogen oxide absorbing liquid regenerated liquid 22 are removed by the second reclaimer 31B, and hence absorption of nitrogen oxides can be sequentially treated.

In regeneration treatment of the second reclaimer 31B, when concentration of nitrates in the nitrogen oxide absorbing liquid regenerated liquid 22 is a specified threshold value, the valve $V_2$ is opened. Then, the part 22a of the nitrogen oxide absorbing liquid regenerated liquid 22 is extracted to be subjected to reclaiming treatment.

With this, nitrites ($NO_2^-$) obtained by a reaction of nitrogen oxides absorbed in the nitrogen oxide absorbing liquid regenerated liquid 22 is released, and is removed as NO. Thus, through the heating, the accumulated amount of nitrogen oxides is reduced, and the waste amount of the residue 37, which is generated through reclaiming by adding the alkaline agent 36a in the second reclaimer 31B, is reduced.

Fourth Embodiment

Figure 5:
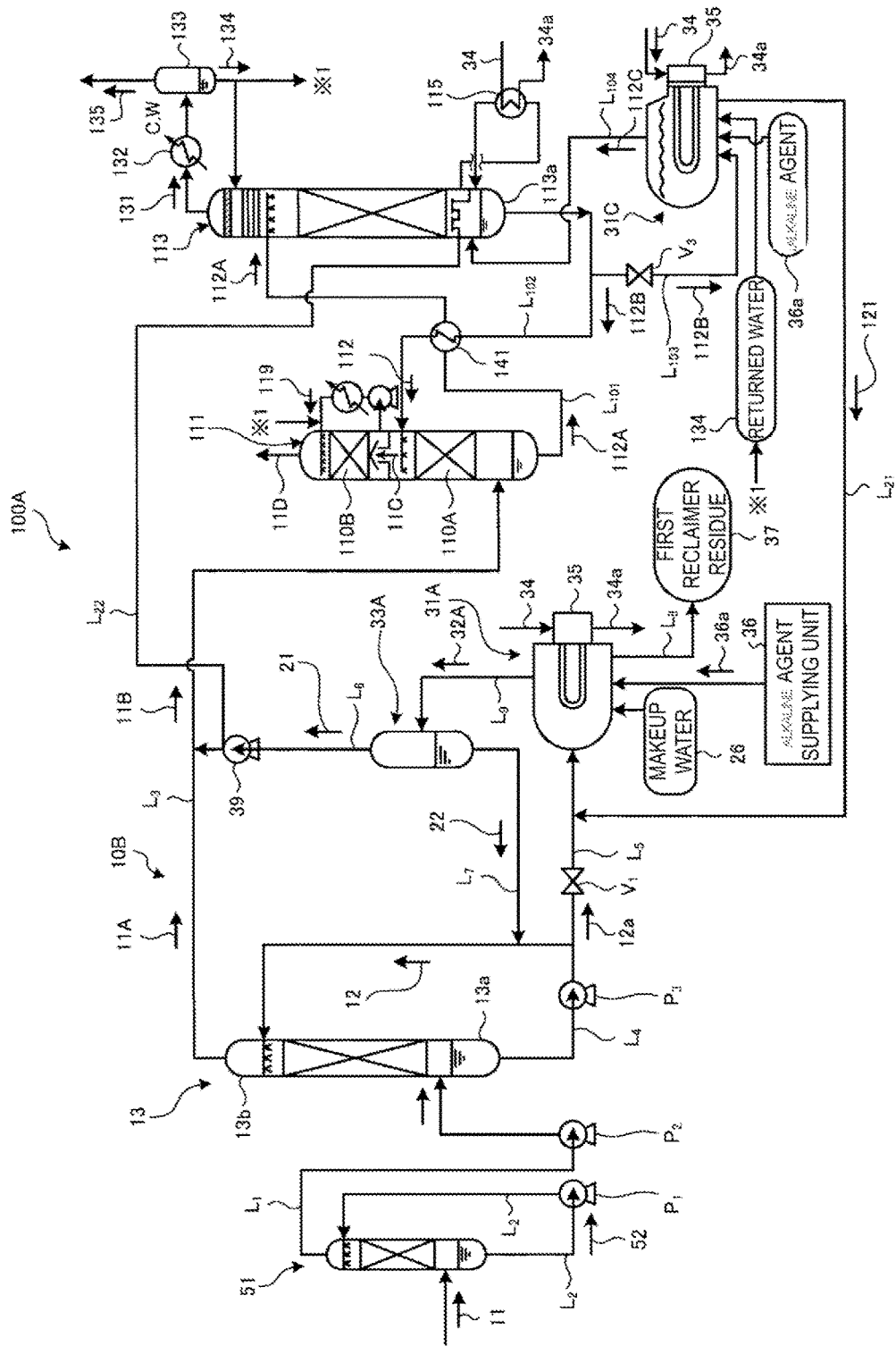
FIG. 5 is a schematic diagram for illustrating a configuration of a $CO_2$ recovery device according to a fourth embodiment of the present invention.

FIG. 5 is a schematic diagram for illustrating a configuration of a $CO_2$ recovery device according to a fourth embodiment of the present invention. As illustrated in FIG. 5, a $CO_2$ recovery device 100A according to the fourth embodiment includes the exhaust gas cooling column 51, the nitrogen oxide absorbing unit 13, the first reclaimer 31A being the nitrogen oxide absorbing liquid heating/regenerating unit 23, a $CO_2$ absorbing column 111, and a $CO_2$ absorbing liquid regenerating column 113. The exhaust gas cooling column 51 cools the exhaust gas 11 containing $NO_x$, $SO_x$, and $CO_2$, which is discharged from the combustion equipment (not shown) such as a boiler and a gas turbine, with the cooling water 52. The nitrogen oxide absorbing unit 13 brings the cooled exhaust gas 11 containing nitrogen oxides and the nitrogen oxide absorbing liquid (first absorbing liquid) 12 for absorbing nitrogen oxides into contact with each other, and absorbs nitrogen oxides in the exhaust gas 11. The first reclaimer 31A obtains the released gas 21 containing at least nitrogen monoxide (NO) and carbon dioxide ($CO_2$) and the nitrogen oxide absorbing liquid regenerated liquid (first regenerated liquid) 22 by extracting, heating and performing regeneration treatment for the nitrogen oxide absorbing liquid 12a being the part of the circulating nitrogen oxide absorbing liquid 12. The $CO_2$ absorbing column 111 includes a $CO_2$ recovery unit 110A for removing $CO_2$ in the exhaust gas 11A discharged from the nitrogen oxide absorbing unit 13. Nitrogen oxides are absorbed in and removed from the exhaust gas 11A. The $CO_2$ absorbing liquid regenerating column 113 regenerates $CO_2$ absorbing liquid by releasing $CO_2$ from $CO_2$ absorbing liquid (hereinafter, also referred to as "rich solution 112A") 112 absorbing $CO_2$, with steam of a second reboiler 115. Then, in the $CO_2$ recovery device 100A, a regenerated $CO_2$ absorbing liquid (hereinafter, also referred to as "lean solution 112B") 112 from which $CO_2$ is removed in the absorbing liquid regenerating column 113 is reused as the $CO_2$ absorbing liquid in the $CO_2$ absorbing column 111.

In a method of recovering $CO_2$ using the $CO_2$ recovery device 100A, first, the exhaust gas 11 containing $NO_x$ and $CO_2$ from the combustion equipment such as a gas turbine is increased in pressure by an exhaust gas sending device (not shown), and then is sent to the exhaust gas cooling column 51. At this state, the exhaust gas 11 is cooled with the cooling water 52, and is sent to the nitrogen oxide absorbing unit 13.

In the nitrogen oxide absorbing unit 13, the exhaust gas 11 is brought into counterflow contact with the nitrogen oxide absorbing liquid 12, and nitrogen oxides in the exhaust gas 11 is absorbed by the nitrogen oxide absorbing liquid 12 as a result of a chemical reaction. With this chemical reaction, nitrogen oxides are turned to nitrates ($NO_3^-$) and nitrites ($NO_2^-$).

The exhaust gas 11A obtained by removing nitrogen oxides in the nitrogen oxide absorbing unit 13 is discharged through the exhaust gas discharge line $L_3$ connected to the top part 13b of the nitrogen oxide absorbing unit 13.

Further, the nitrogen oxide absorbing liquid 12 is circulated and reused through the nitrogen oxide absorbing liquid circulation line $L_4$, and nitrogen oxides in the exhaust gas 11 are absorbed and removed. Then, when the accumulated amount of nitrogen oxides in the nitrogen oxide absorbing liquid 12 is a predetermined amount, the part 12a of the nitrogen oxide absorbing liquid 12 circulating from the nitrogen oxide absorbing liquid circulation line $L_4$ is extracted from the nitrogen oxide absorbing liquid extraction line $L_5$.

The extracted nitrogen oxide absorbing liquid 12 is introduced to the first reclaimer 31A, is subjected to heating and regeneration treatment, is subjected to gas-liquid separation treatment so that the first released steam 32A is separated therefrom, and is regenerated as the nitrogen oxide absorbing liquid regenerated liquid (first regenerated liquid) 22.

Exhaust gas 11B in which the released gas 21 from the first gas-liquid separation device 33A is mixed is sequentially sent to the $CO_2$ absorbing column 111. In the $CO_2$ absorbing column 111, the exhaust gas 11B is brought into counterflow contact with the $CO_2$ absorbing liquid 112 being amine absorbing liquid, and $CO_2$ in the exhaust gas 11B is absorbed in the $CO_2$ absorbing liquid 112 as a result of a chemical reaction. $CO_2$-removed exhaust gas 11C from which $CO_2$ is removed in the $CO_2$ recovery unit 110A is brought into gas-liquid contact with circulating cleaning water 119, which contains the $CO_2$ absorbing liquid supplied from a nozzle, in a cleaning unit 110B in the $CO_2$ absorbing column 111. Then, the $CO_2$ absorbing liquid 112 contained in the $CO_2$-removed exhaust gas 11C is recovered. After that, cleaned exhaust gas 11D from which $CO_2$ is removed is released to the outside of the system.

Further, the rich solution 112A being the $CO_2$ absorbing liquid 112 absorbing $CO_2$ is increased in pressure by a rich solution pump (not shown), is heated with the lean solution 112B being the $CO_2$ absorbing liquid 112 regenerated in the $CO_2$ absorbing liquid regenerating column 113 at a rich/lean solution heat exchanger 141 located in a rich solution supply line $L_{101}$, and is supplied to the $CO_2$ absorbing liquid regenerating column 113.

An endoergic reaction is caused by the rich solution 112A, which is released in an inside of the column from an upper part of the $CO_2$ absorbing liquid regenerating column 113, and steam of the second reboiler 115, which is supplied from a bottom part of the $CO_2$ absorbing liquid regenerating column 113. Accordingly, most part of $CO_2$ is released. The $CO_2$ absorbing liquid from which part or most part of $CO_2$ is released in the $CO_2$ absorbing liquid regenerating column 113 is referred to a semi-lean solution. When the semi-lean solution reaches the bottom part of the $CO_2$ absorbing liquid regenerating column 113, the lean solution 112B being the $CO_2$ absorbing liquid 112 from which almost all $CO_2$ is removed is obtained. A part of the lean solution 112B is heated indirectly with steam generated from the second reboiler 115, and the steam is supplied to the inside of the $CO_2$ absorbing liquid regenerating column 113.

Meanwhile, $CO_2$-contained gas 131 with the rich solution and steam released from the semi-lean solution in the column is guided out from the top part of the $CO_2$ absorbing liquid regenerating column 113. The steam is condensed by a condenser 132, and returned water 134 is separated at a separation drum 133. $CO_2$ gas 135 is released to the outside of the system, is compressed by a separate compressor, and is recovered. The $CO_2$ gas compressed and recovered as described above is pressed in an oil well through use of separate enhanced oil recovery (EOR) equipment, or is stored in an aquifer. In this manner, a global warming mitigation measure is taken.

The returned water 134, which is separated from the $CO_2$-contained gas 131 with the steam at the separation drum 133 and is returned, is supplied by a returned water circulating pump (not shown) to the upper part of the absorbing liquid regenerating column 113, a third reclaimer 31C, and the cleaning water 119 side of the cleaning unit 110B of the $CO_2$ absorbing column 111.

The lean solution 112B being the regenerated $CO_2$ absorbing liquid is cooled with the rich solution 112A at the rich/lean solution heat exchanger 141 located at a crossing part of the rich solution supply line $L_{101}$ and a lean solution supply line $L_{102}$, is increased in pressure by a lean solution pump (not shown), is further cooled by a lean solution cooler (not shown), and then is supplied to the $CO_2$ absorbing column 111.

The lean solution 112B being the $CO_2$ absorbing liquid regenerated in the $CO_2$ absorbing liquid regenerating column 113 is partially branched from the lean solution supply line $L_{102}$ at a branch line $L_{103}$, and is introduced to the third reclaimer 31C. Then, in the third reclaimer 31C, the lean solution 112B being the extracted $CO_2$ absorbing liquid is heated indirectly by supplying the steam 34. In this manner, the co-existing substances are separated. Recovery steam 112C heated in the third reclaimer 31C is introduced to the bottom part of the $CO_2$ absorbing liquid regenerating column 113 through a recovery line $L_{104}$.

This extraction is performed by opening and closing a valve $V_3$ provided to the branch line $L_{103}$. Note that, the third reclaimer 31C is provided with the heating unit 35, which heats the inside indirectly with the steam 34, and the returned water 134 and the alkaline agent 36a are supplied to the inside.

In this embodiment, in the $CO_2$ absorbing liquid regenerating column 113 in this embodiment, reclaimer discharge liquid 121 from the third reclaimer 31C, which extracts part of the lean solution 112B to be subjected to regeneration treatment, passes through a reclaimer discharge liquid supply line $L_{21}$ connected to the nitrogen oxide absorbing liquid extraction line $L_5$. The part 12a of the nitrogen oxide absorbing liquid 12 circulating through the nitrogen oxide absorbing unit 13 is extracted and introduced through the nitrogen oxide absorbing liquid extraction line $L_5$. Further, in the first reclaimer 31A, the part 12a of the nitrogen oxide absorbing liquid (first absorbing liquid) 12 and the introduced reclaimer discharge liquid 121 are subjected to heating and regeneration treatment.

When the tertiary amine being a common component is used in the nitrogen oxide absorbing liquid (first absorbing liquid) 12 and the $CO_2$ absorbing liquid (second absorbing liquid) 112, in a case where the rich solution 112A having absorbed $CO_2$ in the $CO_2$ absorbing column 111 is subjected to regeneration treatment at the $CO_2$ absorbing liquid regenerating column 113 when degraded amine substances (impurities) accumulated in the $CO_2$ absorbing liquid 112 are discharged as the reclaimer discharge liquid 121, the tertiary amine component still remains in the reclaimer discharge liquid 121. Thus, instead of discharging the tertiary amine component as a residue to the outside, the tertiary amine component is introduced to the first reclaimer 31A of the nitrogen oxide absorbing liquid heating/regenerating unit 23, and the remaining tertiary amine component at this state is gasified and recovered. With this, the waste amount of the first reclaimer residue 37 can be reduced.

In this embodiment, it is preferred that the nitrogen oxide absorbing liquid (first absorbing liquid) 12 and the $CO_2$ absorbing liquid (second absorbing liquid) 112 have at least one common component (for example, the tertiary amine) as an absorbing liquid component.

Further, in the released gas 21 released from the first gas-liquid separation device 33A through the released gas line $L_6$, the gasified tertiary amine component is contained. Thus, a common absorbing agent component returning line $L_{22}$, which is branched from a downstream side of a compressor (vacuum pump) 39 installed in the released gas line $L_6$, is provided, and has a distal end connected to the vicinity of a column bottom part 113a of the $CO_2$ absorbing liquid regenerating column 113.

As a result, the gasified body of the regenerated tertiary amine component is introduced to the column bottom part 113a of the $CO_2$ absorbing liquid regenerating column 113. At this state, $CO_2$ is released through heating with the steam, and the $CO_2$ absorbing liquid (second absorbing liquid) 112 is regenerated. With this, the amount of the $CO_2$ absorbing liquid (second absorbing liquid) 112 that is newly supplied from the outside can be reduced.

In this embodiment, regeneration treatment is performed through use of the exhaust gas treatment device 10B according to the second embodiment illustrated in FIG. 2. However, the exhaust gas treatment devices 10C and 10D according to the third embodiment and the fourth embodiment illustrated in FIG. 3 and FIG. 4, respectively, may be used to perform pretreatment for removing nitrogen oxides in the exhaust gas 11.

Figure 6:
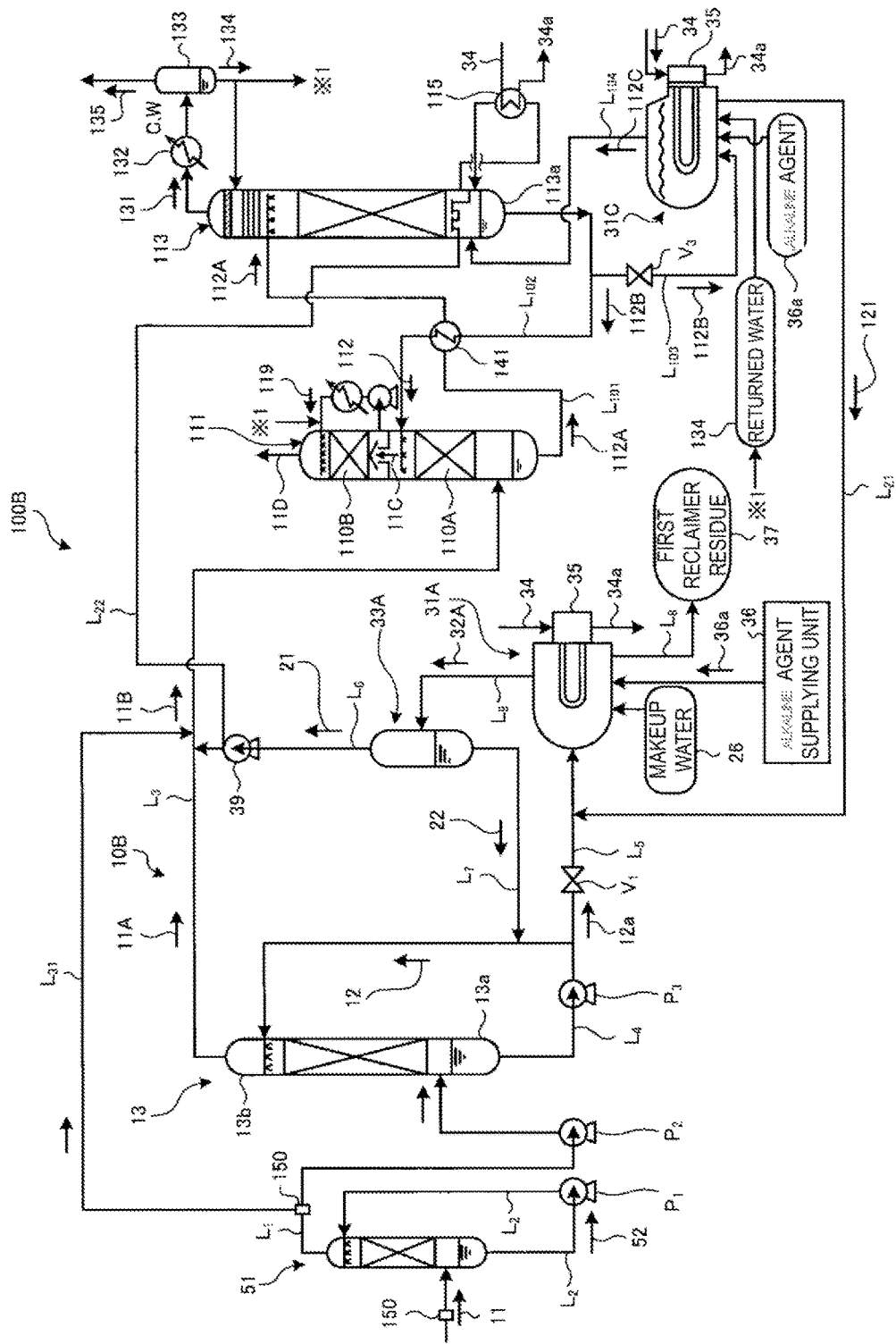
FIG. 6 is a schematic diagram for illustrating a configuration of another $CO_2$ recovery device according to the fourth embodiment.

FIG. 6 is a schematic diagram of another $CO_2$ recovery device according to the fourth embodiment. Note that, members that are the same as those in the first embodiment to the third embodiment are given the same reference symbols, and description thereof is omitted. As illustrated in FIG. 6, in another $CO_2$ recovery device 100B according to the fourth embodiment, a gas introduction path switching unit 150 is installed on downstream of the exhaust gas cooling column 51 in the exhaust gas introduction line $L_1$. Further, by switching the gas introduction path switching unit 150, the exhaust gas 11 is directly introduced from the exhaust gas cooling column 51 to the $CO_2$ absorbing column 111 through a bypass line $L_{31}$.

The content of nitrogen oxides in the exhaust gas 11 and the content of carbon dioxide are as follows. The content of nitrogen oxides is equal to or smaller than 1000 ppm whereas the content of carbon dioxide is several percent to more than 10% (for example 3% to 15%), which is enormous. In this case, nitrogen oxides in the exhaust gas 11 are measured. When the measurement resultant of nitrogen oxides in the exhaust gas 11 is equal to or smaller than a threshold value, the nitrogen oxide absorbing unit 13 is bypassed, and the exhaust gas 11 is introduced directly from the exhaust gas cooling column 51 to the $CO_2$ absorbing column 111.

That is, for example, in a case where a boiler being the combustion device is in a low-load operation, when the measurement resultant of nitrogen oxides in the exhaust gas 11 is equal to or larger than the threshold value, the exhaust gas 11 containing nitrogen oxides is introduced to the nitrogen oxide absorbing unit 13. Then, nitrogen oxides are absorbed and removed by the nitrogen oxide absorbing unit 13, and the exhaust gas 11A from which nitrogen oxides are removed is introduced to the $CO_2$ absorbing column 111. After that, $CO_2$ in the exhaust gas 11A is absorbed and removed. In this manner, cleaned gas 11D is obtained.

Meanwhile, when the boiler is in a normal operation and the measurement resultant of nitrogen oxides in the exhaust gas 11 is equal to or smaller than the threshold value, the gas introduction path switching unit 150 is operated. Then, the exhaust gas 11 is introduced to the bypass line $L_{31}$, and the exhaust gas 11 is introduced only to the $CO_2$ absorbing column 111. After that, $CO_2$ in the exhaust gas 11 is absorbed and removed. In this manner, the cleaned gas 11D may be obtained.

With this, the exhaust gas treatment device is operated only in a case where concentration of nitrogen oxides in the exhaust gas 11 is high. Accordingly, plant operating cost can be reduced.

REFERENCE SIGNS LIST 10A to 10D Exhaust gas treatment device
11 Exhaust gas
12 Nitrogen oxide absorbing liquid (first absorbing liquid)
13 Nitrogen oxide absorbing unit
21 Released gas
22 Nitrogen oxide absorbing liquid regenerated liquid (first regenerated liquid)
23 Nitrogen oxide absorbing liquid heating/regenerating unit
31A to 31C First to third reclaimers
32A to 32C First to third released steam
33A to 33B First and second gas-liquid separation devices
51 Exhaust gas cooling column
100A to 100B $CO_2$ recovery device
112 $CO_2$ absorbing liquid (second absorbing liquid)
111 $CO_2$ absorbing column
113 $CO_2$ absorbing liquid regenerating column

The invention claimed is:
1. An exhaust gas treatment device, comprising:
a nitrogen oxide absorbing unit configured to absorb and remove nitrogen oxides in exhaust gas with nitrogen oxide absorbing liquid by introducing the exhaust gas, which is discharged from a combustion device and contains at least nitrogen oxides and carbon dioxide;
an exhaust gas discharge line for discharging treated exhaust gas from which nitrogen oxides in the exhaust gas are removed;
a nitrogen oxide absorbing liquid circulation line for circulating the nitrogen oxide absorbing liquid, the nitrogen oxide absorbing liquid circulation line connecting a bottom part and a top part of the nitrogen oxide absorbing unit;

a nitrogen oxide absorbing liquid extraction line for extracting the nitrogen oxide absorbing liquid, which is circulating, the nitrogen oxide absorbing liquid extraction line branched from the nitrogen oxide absorbing liquid circulation line;

a nitrogen oxide absorbing liquid heating and regenerating unit configured to obtain released gas containing at least nitrogen monoxide and carbon dioxide and nitrogen oxide absorbing liquid regenerated liquid by subjecting the nitrogen oxide absorbing liquid, which is extracted, to heating and regeneration treatment;

a released gas line for introducing the released gas from the nitrogen oxide absorbing liquid heating and regenerating unit to the exhaust gas discharge line; and a regenerated liquid discharge line for introducing the nitrogen oxide absorbing liquid regenerated liquid from the nitrogen oxide absorbing liquid heating and regenerating unit to the nitrogen oxide absorbing liquid circulation line.

2. The exhaust gas treatment device according to claim 1, wherein the nitrogen oxide absorbing liquid heating and regenerating unit includes an alkaline agent supply unit configured to supply an alkaline agent.

3. The exhaust gas treatment device according to claim 1, wherein the nitrogen oxide absorbing liquid heating and regenerating unit includes:
   a first reclaimer configured to heat the nitrogen oxide absorbing liquid, which is extracted indirectly with steam;
   a released steam line connected to the first reclaimer, for releasing released steam from the first reclaimer; and
   a first gas-liquid separation device connected to the released steam line and configured to separate the released steam from the first reclaimer into the nitrogen oxide absorbing liquid regenerated liquid and released gas.

4. The exhaust gas treatment device according to claim 1, wherein the nitrogen oxide absorbing liquid heating and regenerating unit comprises a nitrogen oxide absorbing liquid regenerating column including a reboiler configured to heat the nitrogen oxide absorbing liquid, which is extracted indirectly with steam, and
wherein the nitrogen oxide absorbing liquid regenerating column includes a second gas-liquid separation device configured to separate released gas from released steam, the second gas-liquid separation device provided in a released steam line for releasing the released steam containing NO and $CO_2$ from a top part of the nitrogen oxide absorbing liquid regenerating column.

5. The exhaust gas treatment device according to claim 4, further comprising a second reclaimer configured to subject the nitrogen oxide absorbing liquid regenerated liquid, which is extracted from a bottom part of the nitrogen oxide absorbing liquid regenerating column, to heating and regeneration treatment such that impurities accumulated in the nitrogen oxide absorbing liquid regenerated liquid are separated and removed.

6. The exhaust gas treatment device according to claim 1, wherein the nitrogen oxide absorbing liquid comprises an amine solution containing tertiary amine or an alkaline solution.

7. A $CO_2$ recovery device, comprising:
   the exhaust gas treatment device of claim 1;
   a $CO_2$ absorbing column configured to remove $CO_2$ by bringing $CO_2$ in exhaust gas, which is introduced through an exhaust gas discharge line and mixed with the released gas, and $CO_2$ absorbing liquid into contact with each other;
   a $CO_2$ absorbing liquid regenerating column configured to regenerate a rich solution having absorbed $CO_2$ with steam of a reboiler;
   a rich solution supply line for extracting the rich solution from the $CO_2$ absorbing column and introducing the rich solution to the $CO_2$ absorbing liquid regenerating column side;
   a lean solution supply line for extracting a lean solution from the $CO_2$ absorbing liquid regenerating column, introducing the lean solution to the $CO_2$ absorbing column, and reusing the lean solution as the $CO_2$ absorbing liquid, the lean solution regenerated in the $CO_2$ absorbing liquid regenerating column, the lean solution from which $CO_2$ is released; and
   a third reclaimer configured to regenerate the lean solution by extracting the lean solution from the lean solution supply line.

8. The $CO_2$ recovery device according to claim 7, further comprising a recovery line connecting the third reclaimer and the $CO_2$ absorbing liquid regenerating column, for introducing recovery steam heated in the third reclaimer to a bottom part of the $CO_2$ absorbing liquid regenerating column.

9. The $CO_2$ recovery device according to claim 7, further comprising a reclaimer discharge liquid introduction line for extracting reclaimer discharge liquid from a bottom part of the third reclaimer and introducing the reclaimer discharge liquid to extracted liquid of the nitrogen oxide absorbing liquid.

10. The $CO_2$ recovery device according to claim 7, wherein the $CO_2$ absorbing liquid and the nitrogen oxide absorbing liquid have at least one common component as an absorbing liquid component.

* * * * *